US005937378A

United States Patent [19]

Serizawa

[11] Patent Number: 5,937,378

[45] Date of Patent: Aug. 10, 1999

[54] WIDEBAND SPEECH CODER AND DECODER THAT BAND DIVIDES AN INPUT SPEECH SIGNAL AND PERFORMS ANALYSIS ON THE BAND-DIVIDED SPEECH SIGNAL

[75] Inventor: Masahiro Serizawa, Tokyo, Japan

[73] Assignee: NEC Corporation, Tokyo, Japan

[21] Appl. No.: 08/880,643

[22] Filed: Jun. 23, 1997

[30] Foreign Application Priority Data

Jun. 21, 1996 [JP] Japan .................................... 8-161286

[51] Int. Cl.$^{6}$ ........................................................ G01L 3/02

[52] U.S. Cl. ........................... 704/230; 704/219; 704/205

[58] Field of Search ............................ 704/203, 219–222, 704/230

[56] References Cited

U.S. PATENT DOCUMENTS

| | | | |
|---|---|---|---|
| 4,817,141 | 3/1989 | Taguchi | 380/9 |
| 5,222,189 | 6/1993 | Fielder | 395/2 |
| 5,230,038 | 7/1993 | Fielder et al. | 395/2 |
| 5,367,608 | 11/1994 | Veldhuis et al. | 395/2.38 |
| 5,394,473 | 2/1995 | Davidson | 381/36 |
| 5,479,562 | 12/1995 | Fielder et al. | 395/2.38 |
| 5,491,773 | 2/1996 | Veldhuis et al. | 395/2.38 |
| 5,633,980 | 5/1997 | Ozawa | 395/2.31 |
| 5,651,090 | 7/1997 | Moriya et al. | 395/2.31 |
| 5,657,349 | 8/1997 | Sugiyama | 375/222 |
| 5,684,920 | 11/1997 | Iwakami et al. | 395/2.12 |

FOREIGN PATENT DOCUMENTS

| | | |
|---|---|---|
| 0 582 921 | 2/1994 | European Pat. Off. . |
| 62-278598 | 12/1987 | Japan . |
| 5-113799 | 5/1993 | Japan . |
| 90/09022 | 8/1990 | WIPO . |
| 95/10760 | 4/1995 | WIPO . |

OTHER PUBLICATIONS

M. Yong et al., "Subband Vector Excitation Coding With Adaptive Bit–Allocation", vol. 2, No. Conf. 14, pp. 743–746, XP000090217, (May 23, 1989).

Jacovo et al., "Some Experiment of 7 kHz Audio Coding at 16 kbit/s", IEEE, (1989), pp. 192–195.

Yong et al., "Subband Vector Excitation Coding with Adaptive Bit–Allocation", IEEE, ICASSP, S14.3, (1989), pp. 743–746.

Esteban et al., "Application of Quadrature Mirror Filters to Split Band Voice Coding Schemes", IEEE Proceeding of ICASSP, (1977), pp. 191–194.

"Linear Predictive Coding of Speech".

Paliwal et al., "Efficient Vector Quantization of LPC Parameters at 24 Bits/Frame", IEEE Transactions on Speech and Audio Processing, vol. 1, No. 1, (1993).

Schroeder et al., "Code–Excited Linear Prediction (CEL-P):High–Quality Speech at Very Low Bit Rates", IEEE Proceedings of ICASSP–85, (1985), pp. 937–940.

"Telecommunication Standardization Sector", (ITU–T) COM15–153–E, (1995).

Soong et al., "Line Spectrum Pair (LSP) and Speech Data Compression", IEEE, (1984).

*Primary Examiner*—David R. Hudspeth
*Assistant Examiner*—Michael N. Opsasnick
*Attorney, Agent, or Firm*—Foley & Lardner

[57] ABSTRACT

An LPC analyzer calculates LPC coefficients from a speech signal input from an input terminal through LPC analysis of the speech signal. An LPC coder codes the LPC coefficients. An impulse response circuit calculates an impulse response from the LPC coefficients obtained by the decoding. A first band divider divides the band of the impulse response. LPC analyzers calculate LPC coefficients for each subband. A second band divider divides the band of the input speech signal input from the input terminal and produces a speech signal for each subband. Coders code an excitation signal for each respective subband by using the LPC coefficients of the respective subband and the speech signal of the respective subband. A multiplexer outputs each code as a modulation signal.

11 Claims, 15 Drawing Sheets

PRIOR ART

PRIOR ART

WIDEBAND SPEECH CODER AND DECODER THAT BAND DIVIDES AN INPUT SPEECH SIGNAL AND PERFORMS ANALYSIS ON THE BAND-DIVIDED SPEECH SIGNAL

BACKGROUND OF THE INVENTION

The present invention relates to a wideband speech and audio signal coding/decoding system and, more particularly, to a band division coding/decoding system.

Well-known speech coding/decoding systems are disclosed in, for instance, R. D. Jacovo et al, "Some Experiments of 7-kHz Audio Coding at 16 kbit/s", IEEE, 1989, pp. 192–195 (hereinafter referred to as Literature 1), and M. Yong, "Subband Vector Excitation Coding with Adaptive Bit-Allocation", IEEE ICASSP 1989, S14.3, pp. 743–746 (hereinafter referred to as Literature 2).

In the wideband speech coding/decoding systems, in coding the band of a band-divided input speech signal the input speech signal is divided into subbands and then coded for each subband. The input signal is modeled using line prediction (LPC) coefficients as an envelope of the spectral form and an excitation signal of a filter constituted by the LPC coefficients, and each subband input speech signal is coded using model parameters of the LPC coefficients and the excitation signal.

In the decoding, each subband speech signal is decoded using the subband decoded LPC coefficients and the excitation signal, and the speech signal is synthesized using the last decoded subband signals.

A prior art wideband speech coding/decoding system will now be described with reference to FIGS. 14 and 15.

First, the operation of the coding part of the system will be described with reference to FIG. 14.

A band divider 20 band-divides a speech signal input from an input terminal 10 (i.e., an input speech signal). LPC analyzers 22 and 24 LPC-analyze each subband input speech signal, and LPC coders 13 and 14 quantize each of the LPC coefficients thus obtained. Coders 26 and 28 quantize the excitation signal using each subband input speech signal and the quantized LPC coefficients. Codes that are obtained as a result of the quantization in the LPC coders 13 and 14 and coders 26 and 28 are outputted to a multiplexer 30. The multiplexer 30 modulates the input codes, and outputs the modulated signal from an output terminal 32.

As means of the band division in the band divider 20, a quadrature mirror filter (QMF), for instance, is well-known in the art. The QMF divides the band with a ratio of 2:1, and it is used a plurality of times to divide the input speech signal into a plurality of subbands. The QMF is detailed in, for instance, IEEE Proceeding of ICASSP, pp. 191–195, 1977 (Literature 3).

As means of the LPC analysis in the LPC analyzers 22 and 24, autocorrelation analysis and covariance analysis are well known in the art. The LPC analysis in LPC analyzers 22 and 24 is detailed in, for instance, L. R. Rabiner and R. W. Schafer, "Digital Processing of Speech Signal", Section S.1, pp. 398–404, Prentice-Hall Signal Processing Series (Literature 4), and is not described here.

As a method of the LPC coefficient quantization in the LPC coders 13 and 14, it is well known to convert the LPC coefficients into a line spectrum pair (LSP) before vector quantization. The vector quantization of the LSP coefficients is detailed in, for instance, IEEE Transactions of Speech and Audio Processing, Vol. 1, No., January 1993 (Literature 5), and is not described here.

As a method of the excitation signal coding in the coders 26 and 28, it is well known one in a Code-Excited Linear Prediction (CELP) system. In the excitation signal coding method in the CELP system, a pitch cycle component of the excitation signal of the input speech signal is represented by a pitch prediction filter, and the filter coefficients thereof and the pitch are quantized. The pitch prediction residue is also vector-quantized. As the distance in the vector quantization is used the error power between the input speech signal and the reproduced speech signal, which is calculated using the quantized LPC coefficients obtained through analysis of the input speech signal. In order to improve the sound quality in the perceptual aspect, the above distance is set by weighting the above error power with the use of a perceptual weighting function which is constituted by the LPC coefficients. The CELP system is detailed in IEEE Proceedings of ICASSSP-85, pp. 937–940, 1985 (Literature 6) and ITU-T Recommendation, 723, International Telecommunication Union Telecommunication Standardization Sector (ITU-T) COM15-153-E, July (Literature 7).

The operation of the decoding part of the system will now be described with reference to FIG. 15.

A multiplexer 36 demodulates the modulation signal that is input from an input terminal 34 to generates codes. LPC decoders 38 and 41 receive the codes from the demultiplexer 36, and obtain each of the subband LPC coefficients by decoding each code. Decoders 48 and 50 receives the codes from the demultiplexer 36, and obtain each subband excitation signal by the decoding. Reproducing circuits 52 and 54 reproduce subband speech signals by using the excitation signals obtained by the decoding in the decoders 48 and 50 and the LPC signals obtained by the decoding in the LPC decoders 38 and 41. A fullband synthesizer 56 synthesizes the fullband speech signal by using the subband speech signals reproduced from the reproducing circuits 52 and 54, and outputs the synthesized signal from an output terminal 56. The operation of the fullband synthesizer 56 is as described in Literature 3 noted above.

As shown above, the prior art wideband speech coder/decoder performs coefficient coding for each subband. Therefore, the quantized coefficients contain band division filter characteristics which need not be transmitted. This means that the prior art speech coding/decoding system quantizes unnecessary information when quantizing the analytically obtained coefficients, resulting in deterioration of its quantization performance.

In addition, the prior art wideband speech coding/decoding system executes LPC quantization after LPC analysis for each subband. Therefore, the analysis order should be determined before the LPC quantization. This means that parameters that are necessary for the analysis for each subband should be determined before quantizing the coefficients obtained as a result of the analysis.

Moreover, in the prior art coding/decoding system the band division in a band division filter may result in the generation of a delay due to the division. For example, in the case of band division into two subbands using a QMF band division filter which generates a D sample delay, extension of the analysis window by L samples to the future results in a (L+D) sample delay. Therefore, if the delay is allowed by only L samples, the length of window extension to the future should be set to (L−D) samples. This limitation may lead to a too short analysis window or failure of having the analysis window center at a proper position. In such a case, the excitation signal coding characteristic is deteriorated. In other words, the scope of the window for cutting out the signal to be used for the analysis is limited by the band-pass filter.

SUMMARY OF THE INVENTION

An object of the present invention is therefore to provide a wideband speech coding/decoding system, which does not transmit unnecessary information and is free from quantization performance deterioration.

Another object of the present invention is to provide a wideband coder/decoder, which does not determine any parameter for the coefficient analysis for each subband before the coefficient quantization.

A further object of the present invention is to provide a wideband speech coder/decoder, in which the analysis window is not limited by any band-pass filter.

According to a first aspect of the present invention, there is provided a wideband speech coding system comprising means for quantizing coefficients obtained from an input speech signal through analysis thereof, means for obtaining an impulse response of the quantized coefficients, means for dividing the frequency band of the impulse response and dividing the band of the input speech signal by calculating each subband coefficients through analysis of each subband impulse response, and means for quantizing an excitation signal of the input speech signal by using the speech signal and coefficients of each subband and outputting a modulation signal obtained by modulating the quantized codes of the coefficients and excitation signal of each subband.

According to a second aspect of the present invention, there is provided a wideband speech decoding system comprising means for determining coefficients by decoding a code obtained through demodulation of an input modulation signal and calculating an impulse response of the coefficients, means for dividing the band of the impulse signal and calculating each coefficients by analyzing each subband impulse response, and means for obtaining each subband excitation signal by decoding each subband code, reproducing each subband speech signal by using the calculated coefficients and decoded excitation signal of each subband, and synthesizing the fullband speech signal from the subband speech signals.

According to a third aspect of the present invention, there is provided a wideband speech coding system comprising means for quantizing coefficients obtained from an input speech signal through analysis thereof, means for dividing the band of the coefficients obtained through the quantization and quantizing an excitation signal of the input speech signal by using each subband speech signal obtained from the input speech signal and each subband coefficients, and means for outputting a modulation signal obtained by modulating the code obtained by quantizing the coefficients and the code obtained by each subband excitation signal.

According to a fourth aspect of the present invention, there is provided a wideband speech decoding system comprising means for obtaining coefficients by decoding a code obtained by an input modulation signal, dividing the band of the coefficients and obtaining each subband excitation signal by decoding each subband code, and means for reproducing each subband speech signal by using each subband coefficients and excitation signal obtained by the decoding and synthesizing the fullband speech signal from the subband speech signals.

According to a fifth aspect of the present invention, there is provided a wideband speech coding system comprising means for quantizing coefficients obtained from an input speech signal through analysis thereof, means for calculating an impulse response of the coefficients obtained by the quantization, dividing the band of the input speech signal by dividing the frequency band of the impulse response and quantizing an excitation signal of the input speech signal and impulse response of each subband, and means for outputting a modulation signal obtained by modulating the code obtained by quantizing the coefficients and the code obtained by quantizing each subband excitation signal.

According to a sixth aspect of the present invention, there is provided a wideband speech. decoding system comprising means for determining coefficients by decoding a code obtained by demodulating an input modulation signal, calculating an impulse response of the coefficients, dividing the band of the impulse response, and means for obtaining each subband excitation signal by decoding the code in each subband, and reproducing each subband speech signal by using each subband impulse response and the excitation signal obtained by the decoding and synthesizing the fullband speech signal from the subband speech signals.

According to a seventh aspect of the present invention, there is provided a wideband speech coding system comprising means for quantizing coefficients obtained from an input speech signal through analysis thereof, means for converting the quantized coefficients into frequency band coefficients, dividing the band of the frequency band coefficients, dividing the band of the input speech signal by converting each subband frequency band coefficients into each subband second coefficients and quantizing an excitation signal of the input speech signal by using the speech signal and second coefficients of each subband, and means for outputting a modulation signal obtained by modulating the code obtained by quantizing the coefficients and the code obtained by quantizing each subband excitation signal.

According to an eighth aspect of the present invention, there is provided a wideband speech decoder comprising means for determining coefficients by decoding a code obtained by demodulating an input modulation signal, converting the coefficients into frequency band coefficients, dividing the band of the frequency band coefficients, converting each subband frequency band coefficients into each subband second coefficients, and obtaining each subband excitation signal by decoding each subband code, and means for reproducing each subband speech signal by using the second coefficients and the excitation signal obtained by the decoding in each subband.

According to a ninth aspect of the present invention, there is provided a wideband speech coding system comprising means for converting coefficients obtained from an input speech signals through analysis thereof into frequency band coefficients and quantizing the frequency band coefficients, means for dividing the band of the quantized frequency band coefficients into subband frequency band coefficients, dividing the frequency of the input speech signal by converting each subband frequency band coefficients into a second coefficients and quantizing an excitation signal of the input speech signal by using the speech signal and second coefficients of each subband, and means for outputting a modulation signal obtained by modulating the codes obtained by quantizing the coefficients and each subband excitation signal.

According to a tenth aspect of the present invention, there is provided a wideband speech decoding system comprising means for determining a frequency band coefficients by decoding a code obtained by demodulating an input modulation signal, means for dividing the frequency band coefficients into subband frequency band coefficients, converting each thereof into second coefficients and obtaining each subband excitation signal by decoding the code in each subband, and means for reproducing each subband speech signal by using the second coefficients and the excitation signal obtained by the decoding of each subband and synthesizing the fullband speech signal from the subband speech signals.

According to an eleventh aspect of the present invention, there is provided a wideband speech coding system comprising means for dividing the band of an input speech signal and determining frequency band coefficients by demodulating coefficients obtained from each subband speech signal through analysis thereof, means for obtaining fullband frequency band coefficients by combining the subband frequency band coefficients and quantizing the fullband frequency band coefficients, means for dividing the band of the quantized frequency band coefficients into subbands and into subband quantized frequency band coefficients and converting each thereof into a second coefficients, and means for quantizing the excitation signal of each subband speech signal by using each subband second coefficients and outputting a modulation signal obtained by demodulating the codes obtained by quantizing the frequency band coefficients and excitation signal of each subband.

As shown above, according to the present invention the coefficients which are obtained for the input fullband speech signal are quantized for the full band. It is thus possible to obtain quantized coefficients, which are free from band division filter characteristics.

In addition, by permitting analysis for each subband once again after conversion of the fullband quantized coefficients into impulse responses, the coefficient analysis parameters may be varied after the coefficient quantization.

Moreover, by making the fullband analysis before the band division, the analysis window is not affected by any delay due to the band division.

Other objects and features will be clarified from the following description with reference to attached drawings.

PREFERRED EMBODIMENTS OF THE INVENTION

Figure 1:
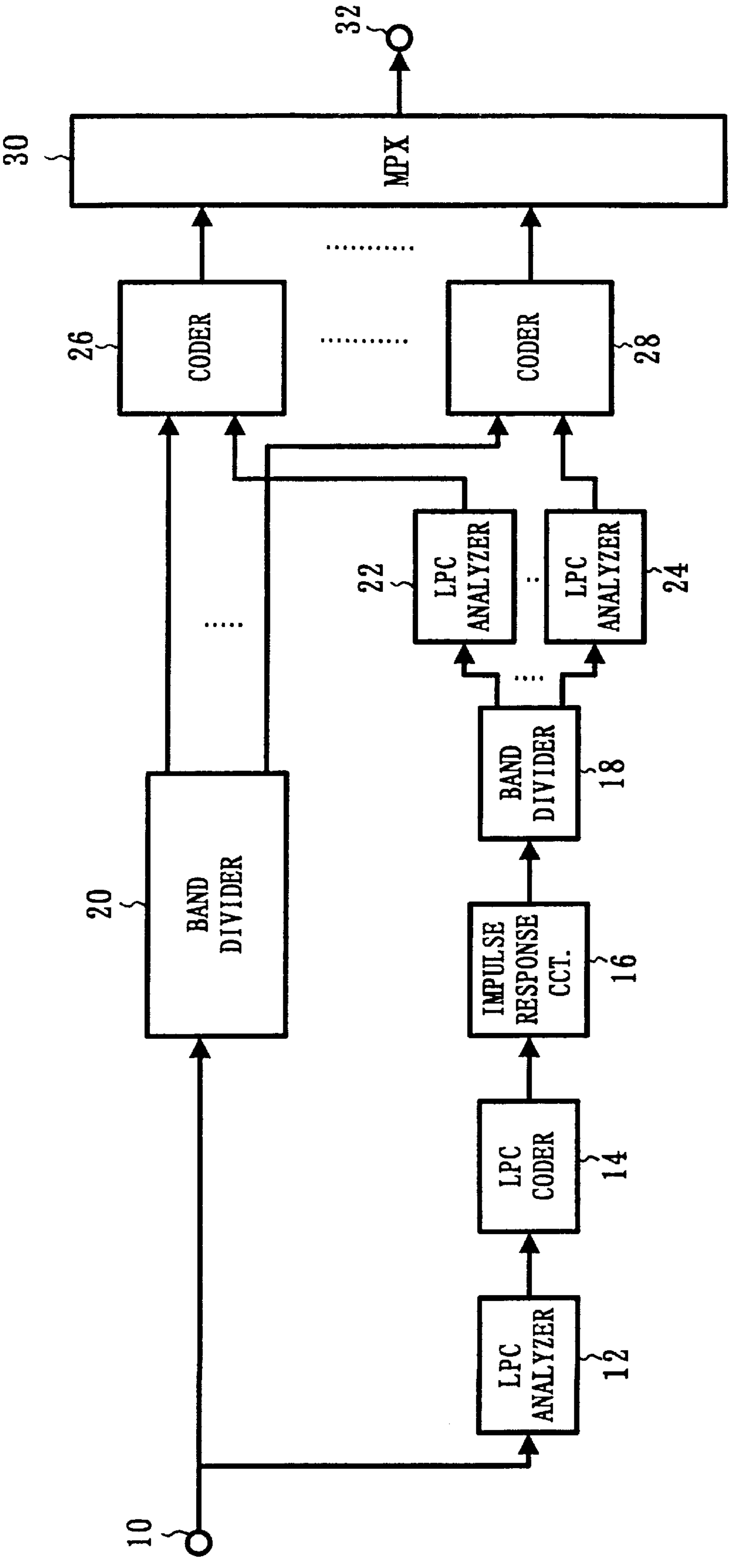
FIG. 1 shows the coding part of a first embodiment of the present invention.

FIG. 1 shows the coding part of a first embodiment of the present invention.

An LPC analyzer 12 calculates the LPC coefficients of a speech signal input from an input terminal 10 through LPC analysis of the signal. An LPC coder 14 codes the LPC coefficients to generate coded LPC coefficients. An impulse response circuit 16 calculates the impulse response of the signal by using the coded LPC coefficients. A band divider 18 divides the band of the impulse response. LPC analyzers 22 and 24 calculate the subband LPC coefficients of each subband.

A band divider 20 divides the band of the speech signal input from the input terminal 10 to produce subband speech signals (i.e., subband signals). Coders 26 and 28 code an excitation signal using the subband LPC coefficients and the subband signal for each subband. A multiplexer 30 outputs the codes thus obtained as a modulation signal from an output terminal 32.

The impulse response circuit 16 constitutes a autoregressive filter H(z) given by equation (1) using the quantized LPC coefficients a(i) received from the LPC coder 14.

$$H(z)=1/(1+\Sigma_{i=0}a(i)z) \quad (1)$$

where P is the degree of the LPC analysis, and outputs an output signal when signal [1,0,0,0,0,0, . . . ,0] is input.

A band divider 18 divides the band of the received impulse response with the QMF band division filter noted above.

Figure 2:
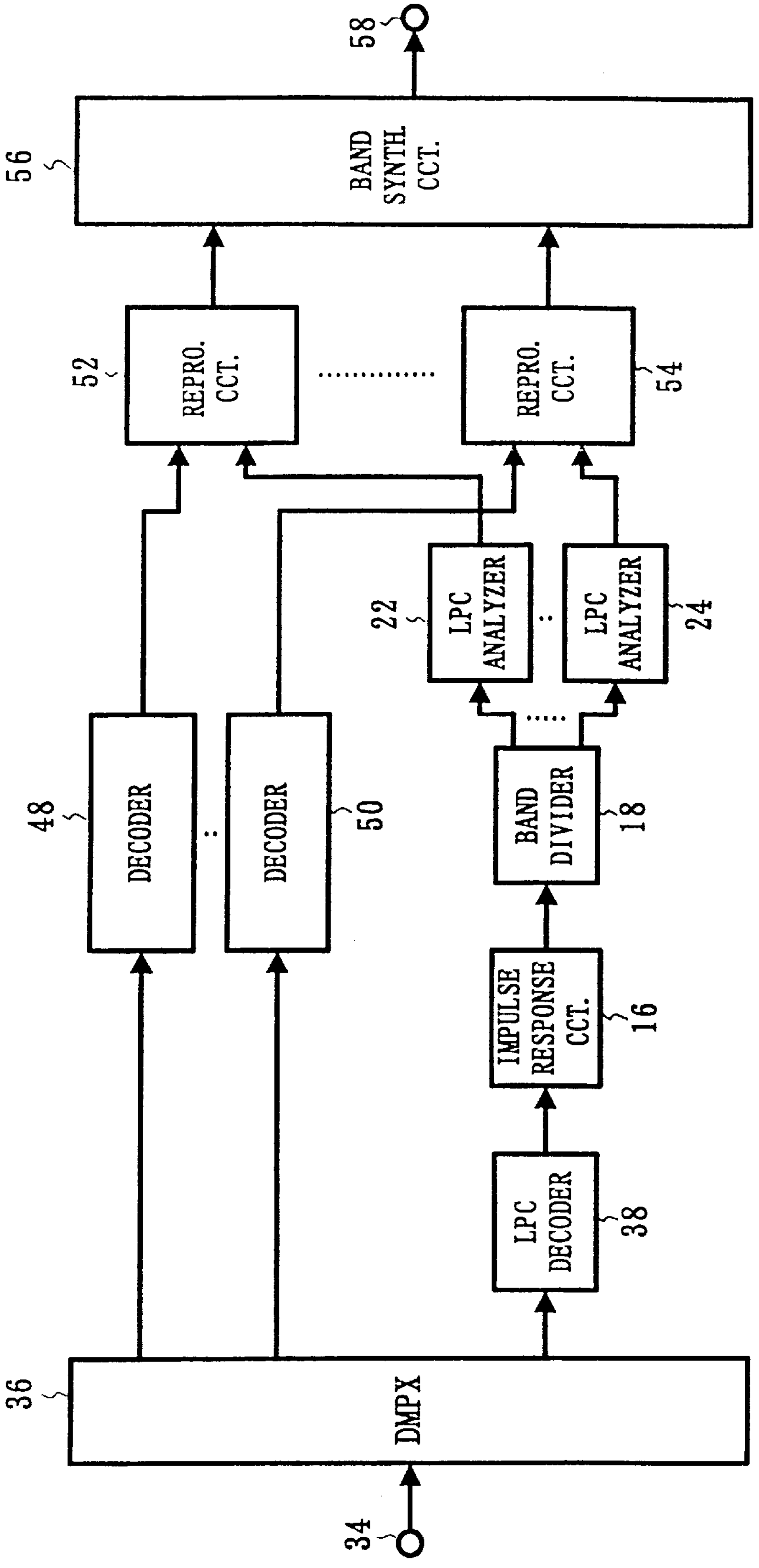
FIG. 2 shows the decoding part of the first embodiment.

FIG. 2 shows the decoding part of the first embodiment. A demultiplexer 36 obtains the code by demodulating the modulation signal input from an input terminal 34. An LPC decoder 38 obtains the LPC coefficients by decoding the code. An impulse response circuit 16 calculates the impulse response from the LPC coefficients. A band divider 18 divides the band of the impulse response. LPC analyzers 22 and 24 calculate the subband LPC coefficients for each subband. Decoders 48 and 50 obtain the excitation signal of each subband through the decoding. Reproducing circuits 52 and 54 decode each subband speech signal by using the LPC coefficients and excitation signal of each subband. A fullband synthesizer 56 synthesizes the fullband decoded speech signal from the subband decoded speech signals, and outputs the decoded speech signal to an output terminal 58.

Figure 3:
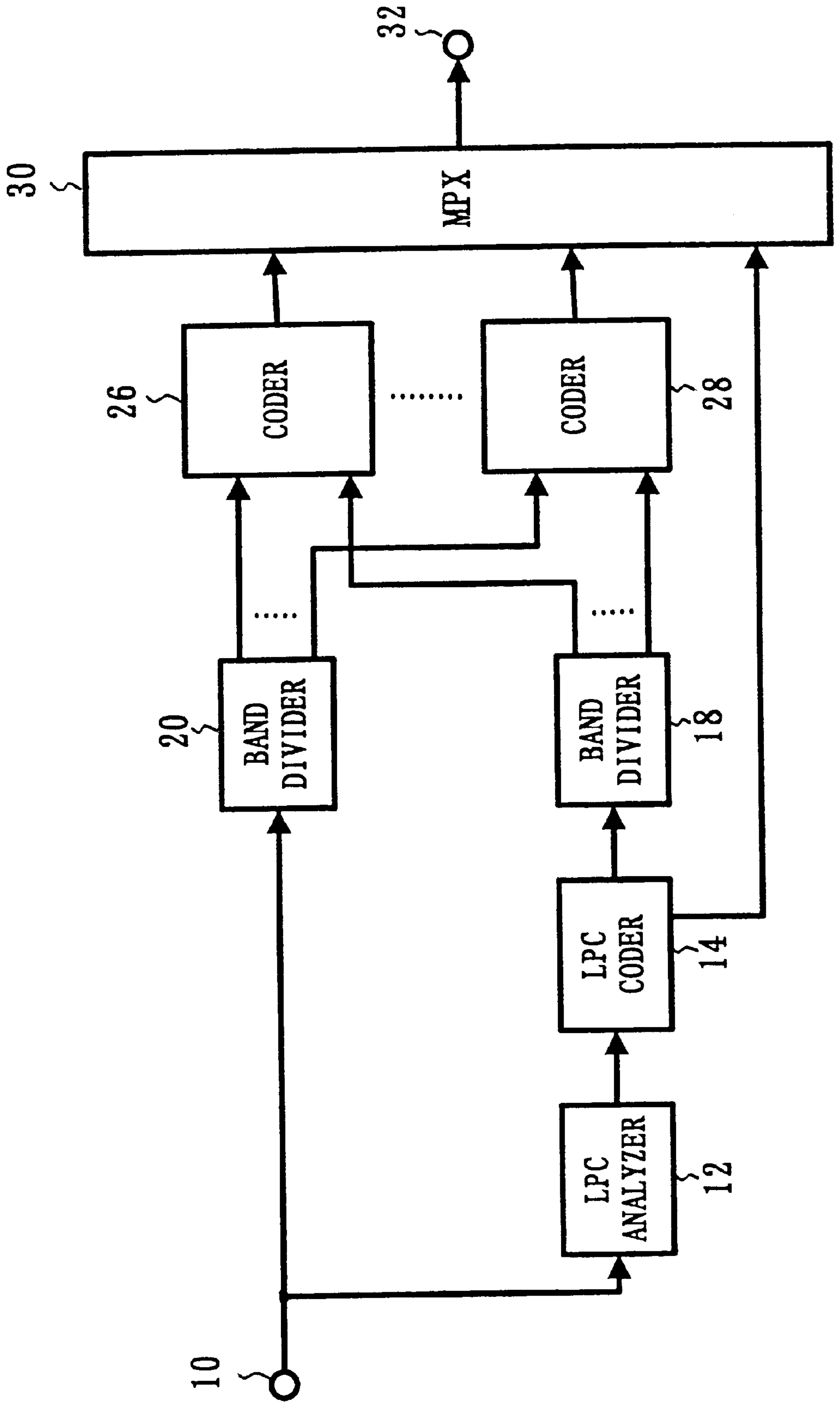
FIG. 3 shows the coding part of a second embodiment.

FIG. 3 shows the coding part of a second embodiment. An LPC analyzer 12 calculates the LPC coefficients of a speech signal input from an input terminal 10 through LPC analysis of the signal. An LPC coder 14 codes the LPC coefficients. A filter band divider 18 divides the band of coded LPC coefficients, and calculates the LPC coefficients of each subband (i.e., subband LPC coefficients).

A band divider 20 divides the band of the speech signal input from the input terminal 10, and calculates the LPC coefficients of each subband i.e., subband LPC coefficients). Coders 26 and 28 code the excitation signal using the subband LPC coefficients and the subband signal for each subband. A multiplexer 30 outputs the code thus obtained as a modulation signal from an output terminal 32.

The band divider 18 receives a signal [1,a(0),a(1), . . . , a(P),0,0, . . . ,0], obtained by zero-padding to the end of the received LPC coefficients and divides the signal with the QMF band division filter noted above.

The coding part shown in FIG. 3 is different from the coding part shown in FIG. 1 in the method of the LPC coefficients band division.

Figure 4:
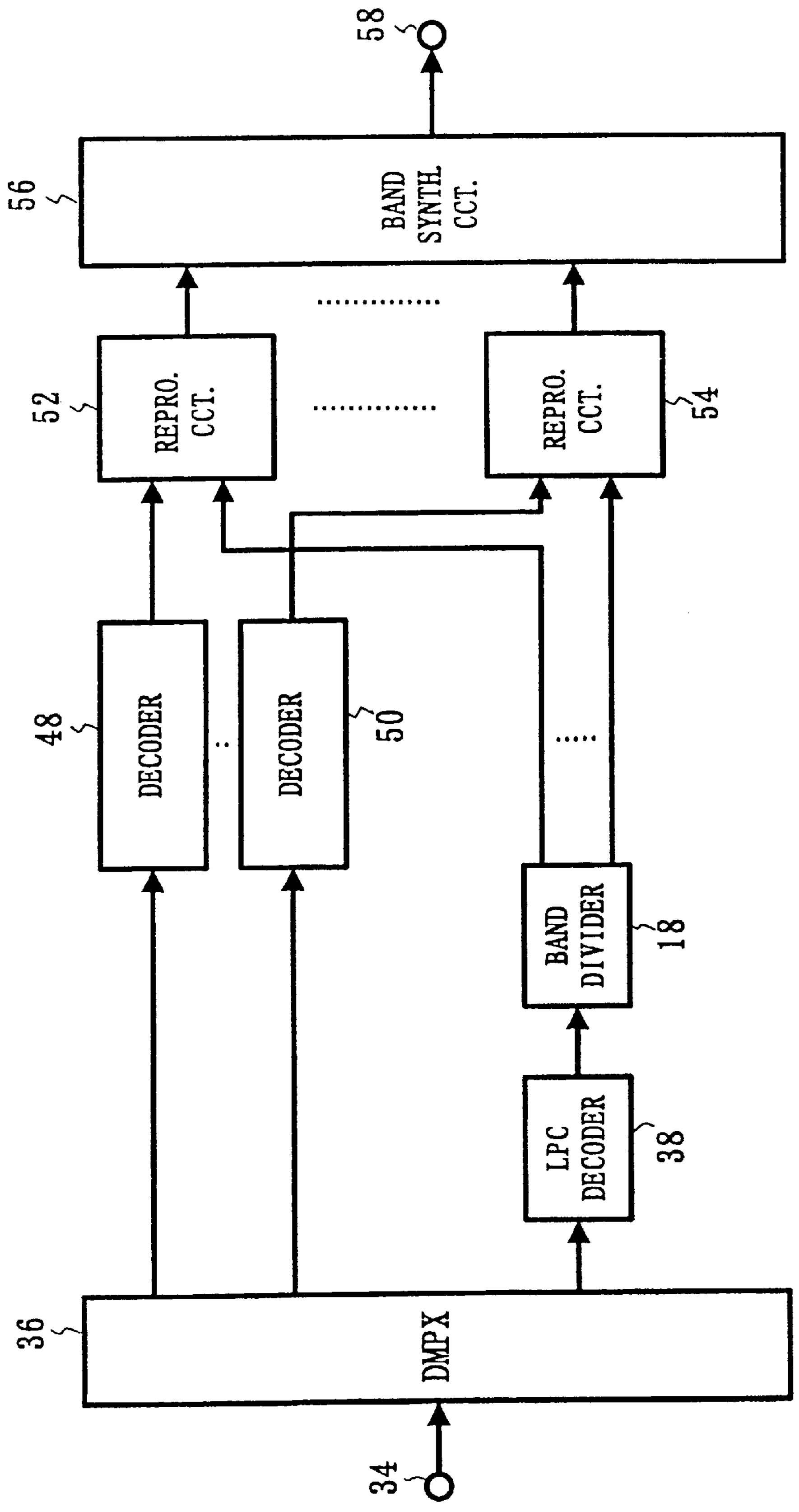
FIG. 4 shows the decoding part of the second embodiment.

FIG. 4 shows the decoding part of the second embodiment. A demultiplexer 36 demodulates the code from the modulation signal input from an input terminal 34. A band divider 18 divides the band of the LPC coefficients, and calculates each subband LPC coefficients. Decoders 48 and 50 obtain each subband excitation signal through the decoding, and reproducing circuits 52 and 54 demodulate each subband speech signal by using the LPC coefficients and excitation signal of each subband. A band synthesizer 56 synthesizes the fullband decoded speech signal from the subband decoded speech signals, and outputs the decoded speech signal from an output terminal 58.

The decoding part shown in FIG. 4 is different from the decoding part shown in FIG. 2 in the LPC coefficient band division method.

Figure 5:
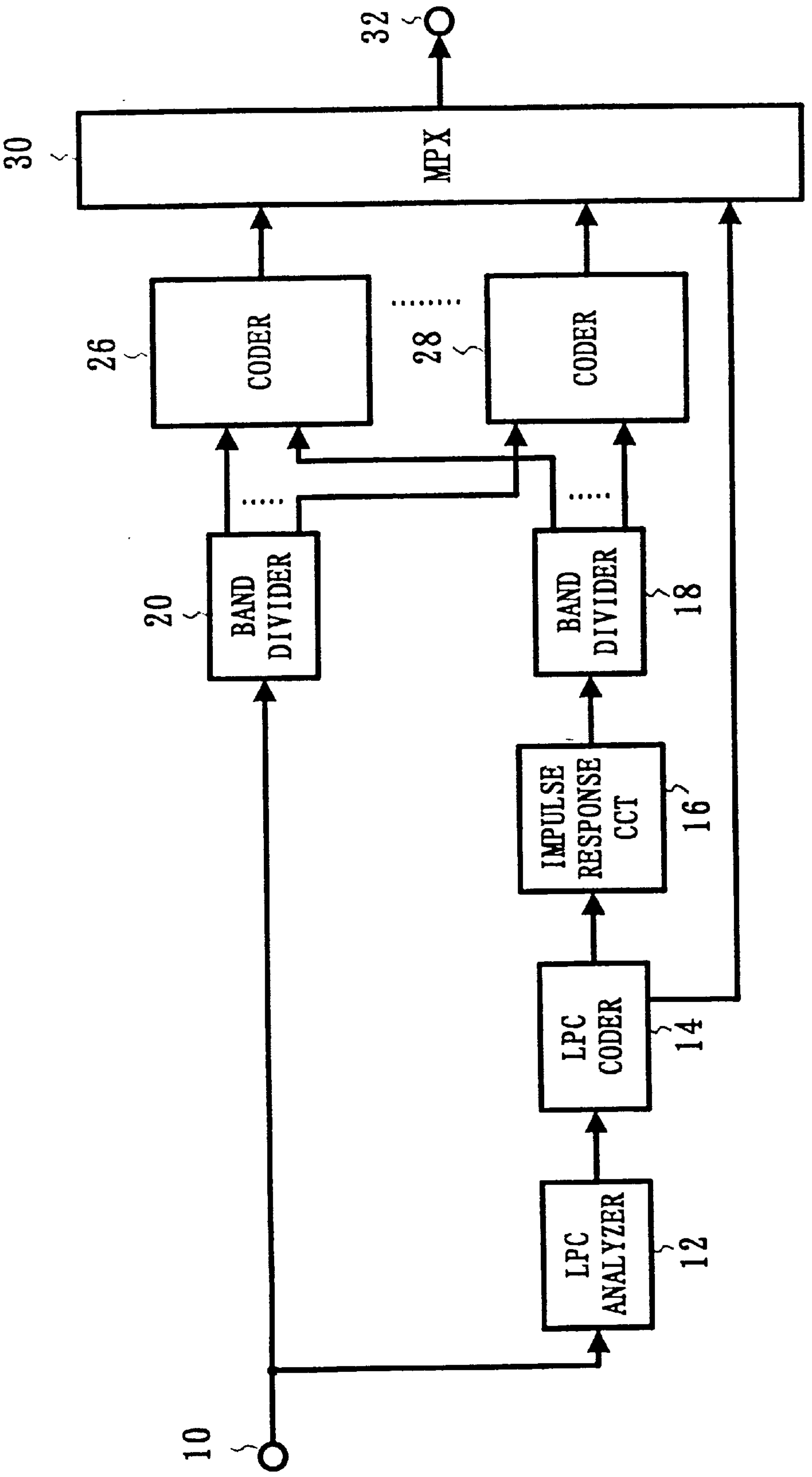
FIG. 5 shows the coding part of a third embodiment.

FIG. 5 shows the coding part of a third embodiment. An LPC analyzer 12 calculates the LPC coefficients of a speech signal input from an input terminal 10 through the LPC analysis of the signal. An LPC coder 14 codes the LPC coefficients. An impulse response circuit 16 calculates the impulse response by using the coded LPC coefficients. A band divider 20 divides the band of the speech signal input from the input terminal 10 and generates each subband speech signal. Coders 26 and 28 code each subband excitation signal by using the impulse response and the input speech signal of each subband. A multiplexer 30 outputs the codes as a modulation signal from an output terminal 32.

The coding part shown in FIG. 1 uses, as a reproducing filter for reproduction, a auto-regressive filter constituted by the LPC coefficients, whereas the coding part shown in FIG. 5 uses a moving average filter constituted by the impulse response.

Figure 6:
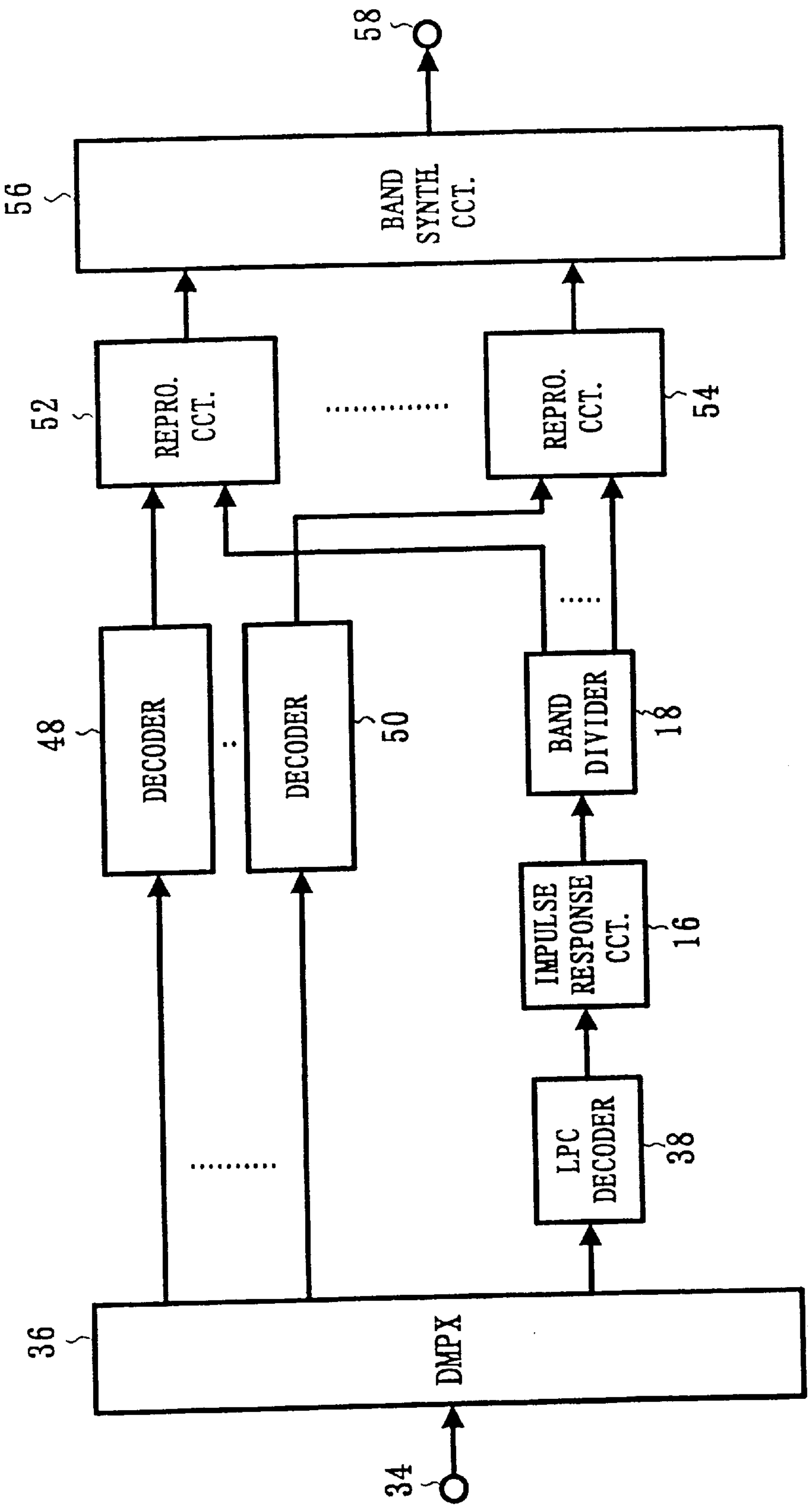
FIG. 6 shows the decoding part of the third embodiment.

FIG. 6 shows the decoding part of the third embodiment. A multiplexer 36 demodulates the code from the modulation signal input from an input terminal 34. An LPC decoder 38 obtains the LPC coefficients by decoding the code. An impulse response circuit 16 calculates the impulse response from the LPC coefficients. A band divider 18 divides the band of the impulse response. Decoders 48 and 50 obtain each subband excitation signal through the decoding. Reproducing circuits 52 and 54 decode each subband speech signal by using the impulse response and the excitation signal of each subband. A band synthesizer 56 synthesizes the fullband speech signal from the subband decoded speech signals, and outputs the decoded speech signal from an output terminal 58.

The decoding part shown in FIG. 2 uses, as a reproducing filter for reproduction, an auto-regressive filter constituted by LPC coefficients, whereas the decoding part shown in FIG. 6 uses a moving average filter constituted by impulse response.

Figure 7:
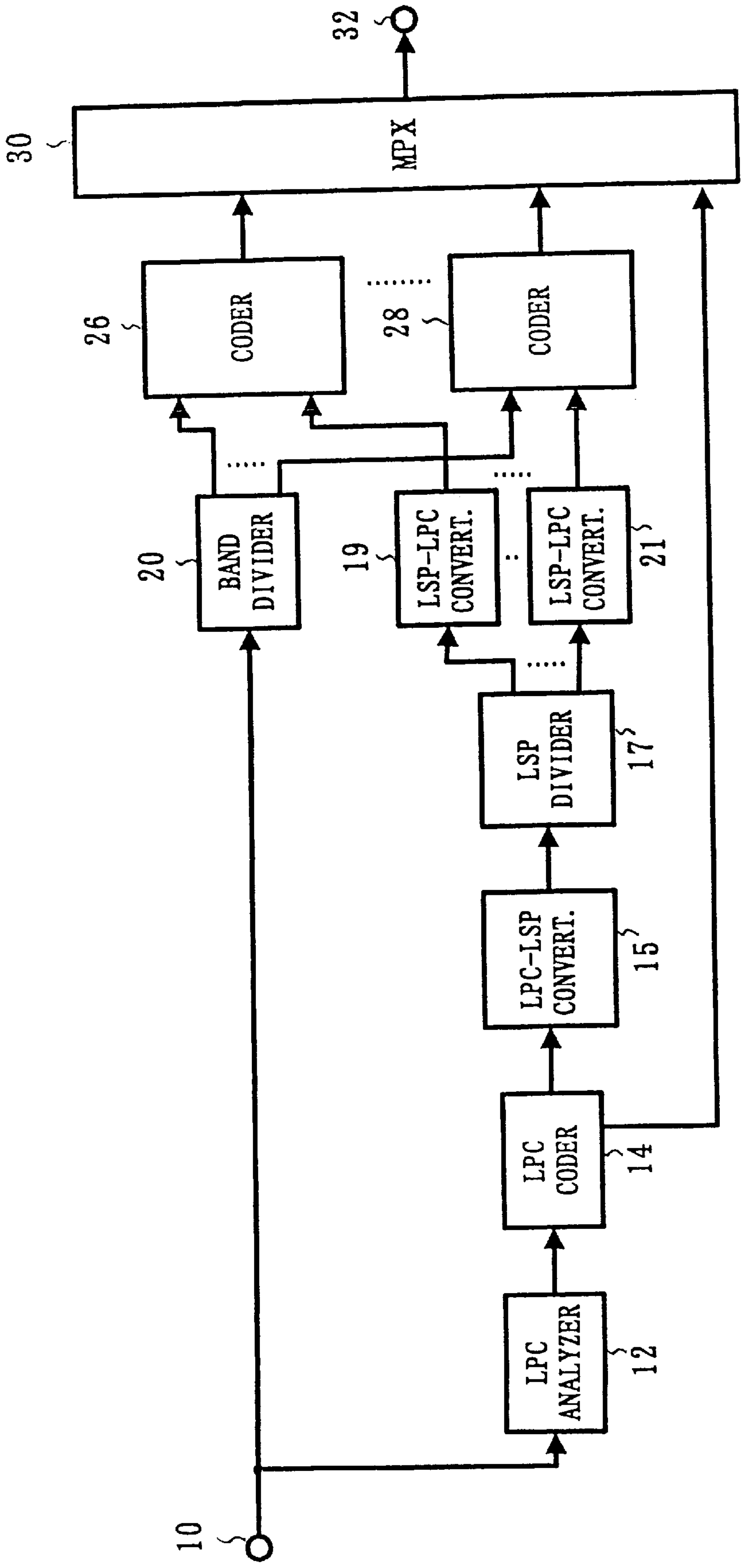
FIG. 7 shows the coding part of a fourth embodiment.

FIG. 7 shows the coding part of a fourth embodiment. An LPC analyzer 12 calculates the LPC coefficients of a speech signal input from an input terminal 10 through LPC analysis. An LPC coder 14 codes the LPC coefficients. An LPC-LSP converter 15 converts the LPC coefficients into the LSP coefficients. An LSP band divider 17 divides the LSP coefficients into subband LSP coefficients.

LSP-LPC converters 19 and 21 convert each subband LSP coefficients into the corresponding subband LPC coefficients. A band divider 20 divides the band of the speech signal input from the input terminal 10, and generates each subband speech signal. Coders 26 and 28 code each subband excitation signal by using the LPC coefficients and the input speech signal of each subband. A multiplexer 30 outputs each code as a modulation signal from an output terminal 32.

As shown, the LPC-LSP converter 15 and the SP-LPC converters 19 and 21 execute the conversion between the LPC and LSP coefficients. The method of the conversion is detailed in, for instance, IEEE Proceedings of CASSP-84, pp. I.10.1–I.10.4, 1994 (Literature 8).

The LSP band divider 17 classifies LSP coefficients into pertaining subbands. For example, in the case where the band division number is 2, the LSP band divider 15 checks the subbands, to which LSP coefficients which have frequency-defined values L(1), L(2), . . . , L(P) belong. Where LSP coefficients L(1) to L(4) and L(5) to L(P) belong to the first and second subbands, respectively, the LSP band divider 17 outputs LSP coefficients L(1), . . . , L(4) and L(5), . . . , L(P), respectively.

The coding part shown in FIG. 1 divides the LPC coefficients through the impulse response as the method of the filter coefficient band division, whereas the coding part shown in FIG. 7 effects the band division through the LSP coefficients.

Figure 8:
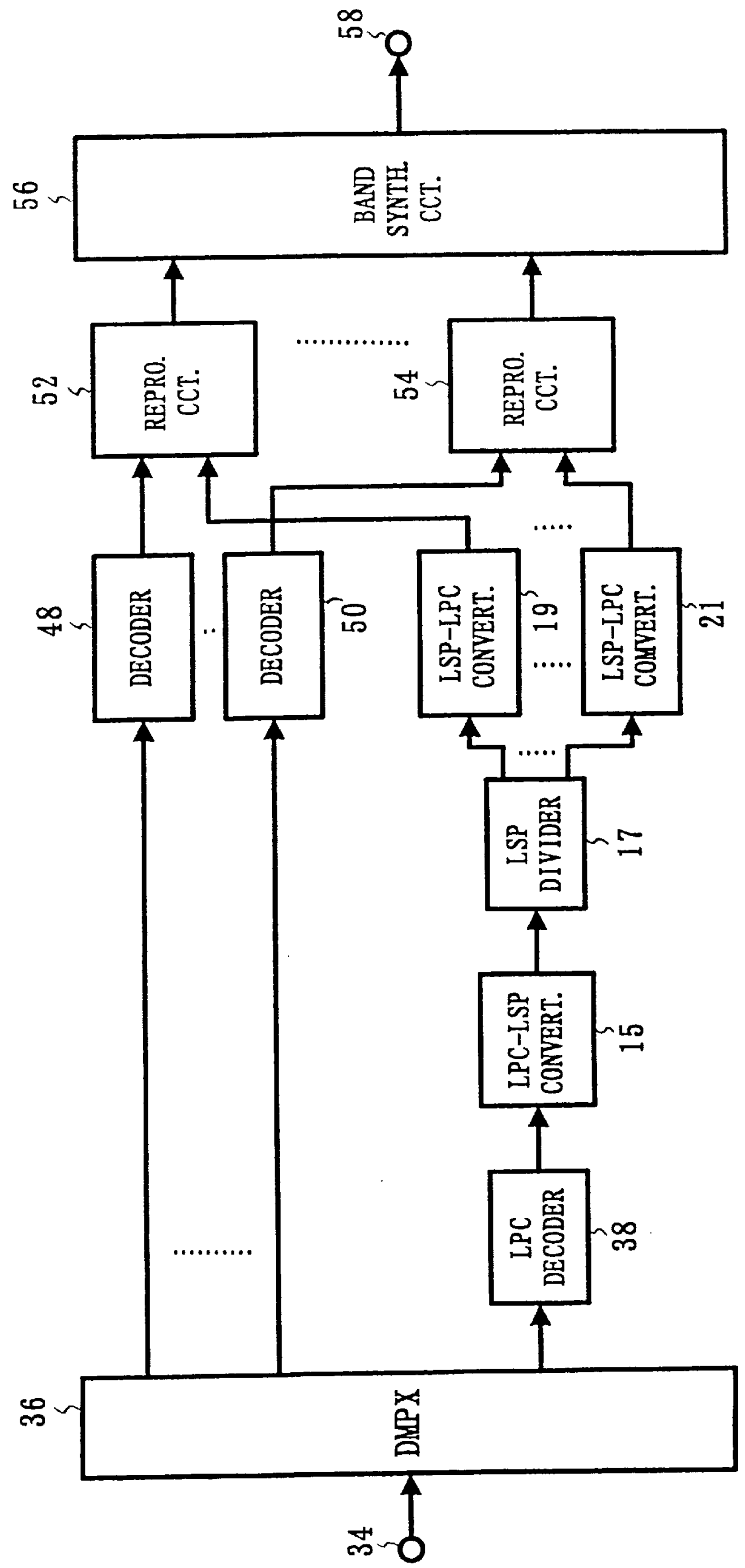
FIG. 8 shows the decoding part of the fourth embodiment.

FIG. 8 shows the decoding part of the fourth embodiment. A multiplexer 36 demodulates the code from the modulation signal input from an input terminal 34. An LPC decoder 38 obtains the LPC coefficients by decoding the code. An LPC-LSP converter 15 converts the LPC coefficients into the LSP coefficients. An LSP band divider 17 divides the LSP coefficients into subband LSP coefficients.

LSP-LPC converters 19 and 21 convert each subband LSP coefficients into each subband LPC coefficients. Decoders 48 and 50 obtain each subband excitation signal by the decoding. Reproducing circuits 52 and 54 decode each subband speech signal by using the LPS coefficients and the excitation signal of each subband. A band synthesizer 56 synthesizes the fullbands decoded speech signal from the subband decoded speech signals, and outputs the decoded speech signal from an output terminal 58.

The decoding part shown in FIG. 2 divides the LPC coefficient band through the LPC coefficients as the method of the filter coefficient band division, whereas the decoding part shown in FIG. 8 executes the band division through the LSP coefficients.

Figure 9:
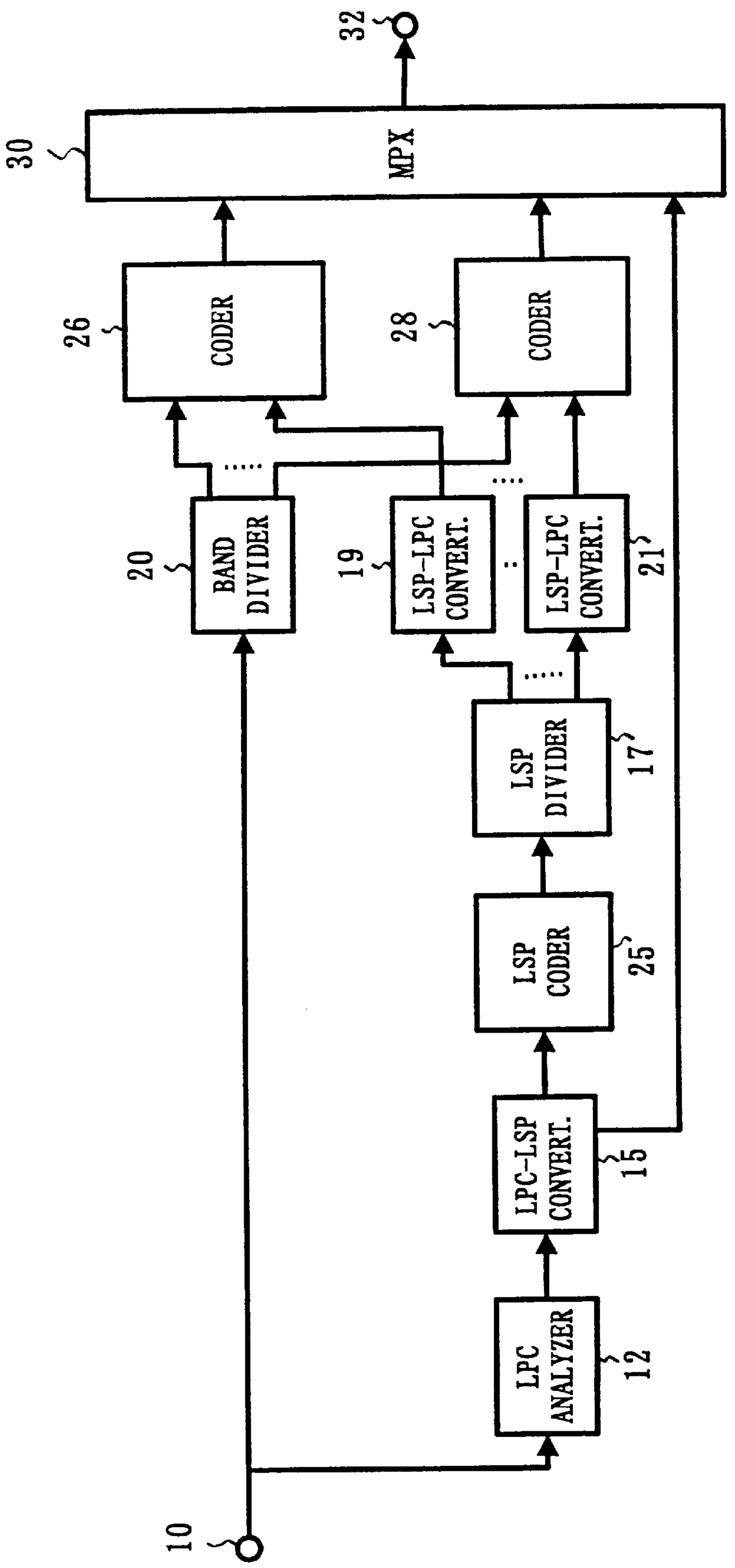
FIG. 9 shows the coding part of a fifth embodiment.

FIG. 9 shows the coding part of a fifth embodiment. An LPC analyzer 12 calculates the LPC coefficients of a speech signal input from an input terminal 10 by performing LPC analysis of the signal. An LPC-LSP converter 15 converts the LPC coefficients into the LSP coefficients. An LSP coder 25 codes the LSP coefficients. An LSP band divider 17 divides the LSP coefficients into subband LSP coefficients.

LSP-LPC converters 19 and 21 converts each subband LSP coefficients into each subband LPC coefficients. A band divider 20 divides the band of the speech signal input from the input terminal 10 to generate each subband speech signal. Coders 26 and 28 code each subband excitation signal by using the LPC coefficients and the input speech signal of each subband. A multiplexer 30 outputs each code as a modulation signal from an output terminal 32.

The coding part shown in FIG. 7 quantizes the LPC coefficients, whereas the coder shown in FIG. 9 converts the LPC coefficients into the LSP coefficients before quantization thereof.

Figure 10:
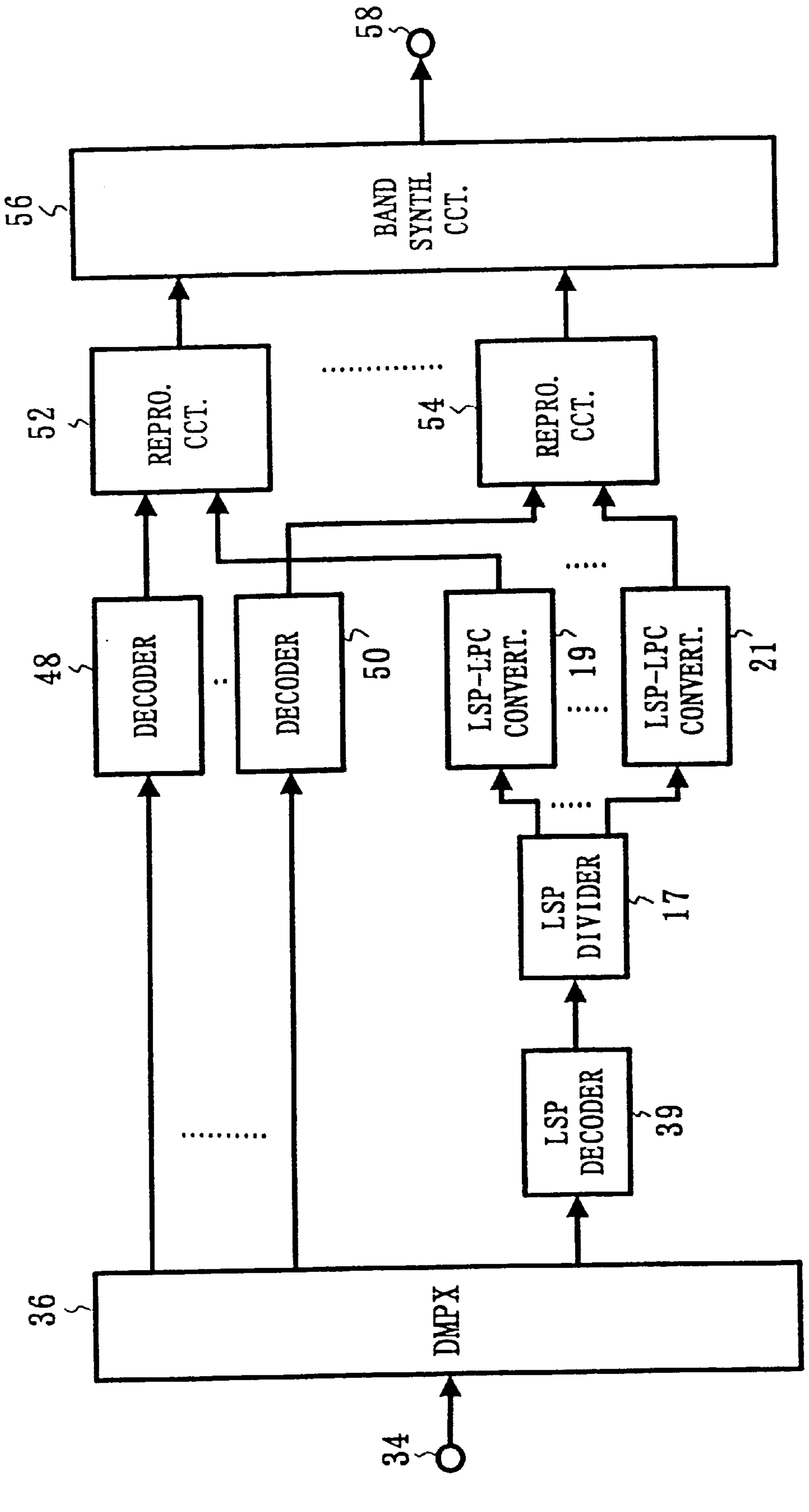
FIG. 10 shows the decoding part of the fifth embodiment.

FIG. 10 shows the decoding part of the fifth embodiment. A demultiplexer 36 obtains the code by demodulating the modulation signal input from the input terminal 34. An LSP decoder 39 obtains the LSP coefficients by decoding the code. An LSP band divider 17 divides the LSP coefficients into each subband LSP coefficients.

LSP-LPC converters 19 and 21 convert each LSP coefficients into each subband LPC coefficients. Decoders 48 and 50 decode each subband speech signal by using the LPC coefficients and the excitation signal from each subband. A band synthesizer 56 synthesizes the fullband decoded speech signal from the subband decoded speech signals, and outputs the decoded speech signal from an output terminal 58.

Figure 11:
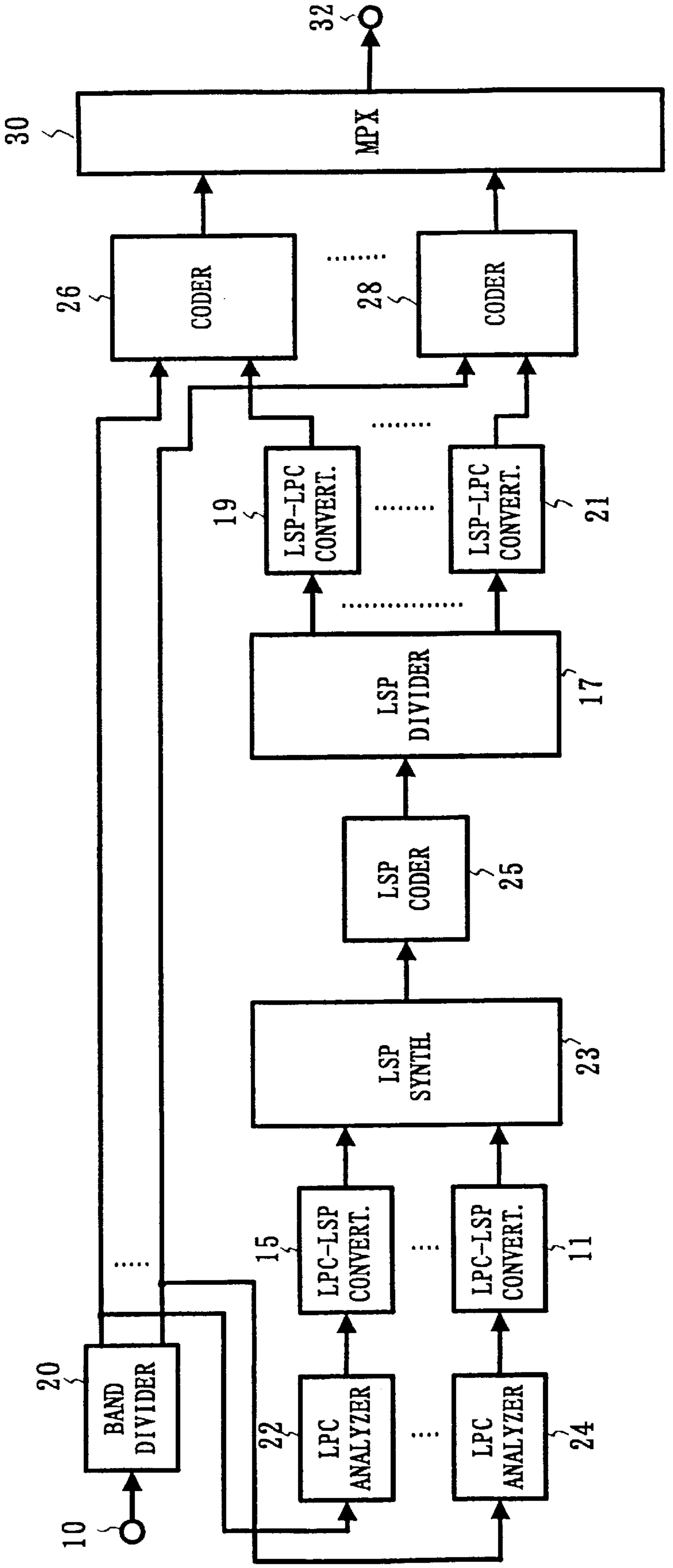
FIG. 11 shows the coding part of a sixth embodiment.

FIG. 11 shows the coding part of a sixth embodiment. A band divider 20 divides the band of an input speech signal input from an input terminal 10. LPC analyzers 22 and 24 calculate the LPC coefficients of each subband speech signal through LPC analysis. LPC-LSP converters 11 and 15 convert each subband LSP coefficients into each subband LSP. An LSP synthesizer 23 combines the subband LSP coefficients. An LSP coder 25 codes the resultant LSP coefficients. An LSP band divider 17 divides the coded LSP coefficients into subband LSP coefficients.

LSP-LPC converters 19 and 21 convert each subband LSP coefficients into each subband LPC coefficients. Coders 26 and 28 code each subband excitation signal by using the LPC coefficients and the input speech signal of each subband. A multiplexer 30 outputs each code as a modulation signal from an output terminal 32.

The LSP synthesizer 23 combines the received subband LSP coefficients in the order of lower subbands. For example, where subband coefficients [L(1), . . . ,L(4)] and [L(5), . . . ,L(P)] are input to it with a division ratio of 2, the LSP synthesizer 23 outputs an output [L(1),L(2), . . . ,L(P)] as the resultant LSP coefficients.

The coding parts shown in FIGS., 9 and 11 are different from each other in whether the LPC analysis is done in the full band or in each subband.

Figure 12:
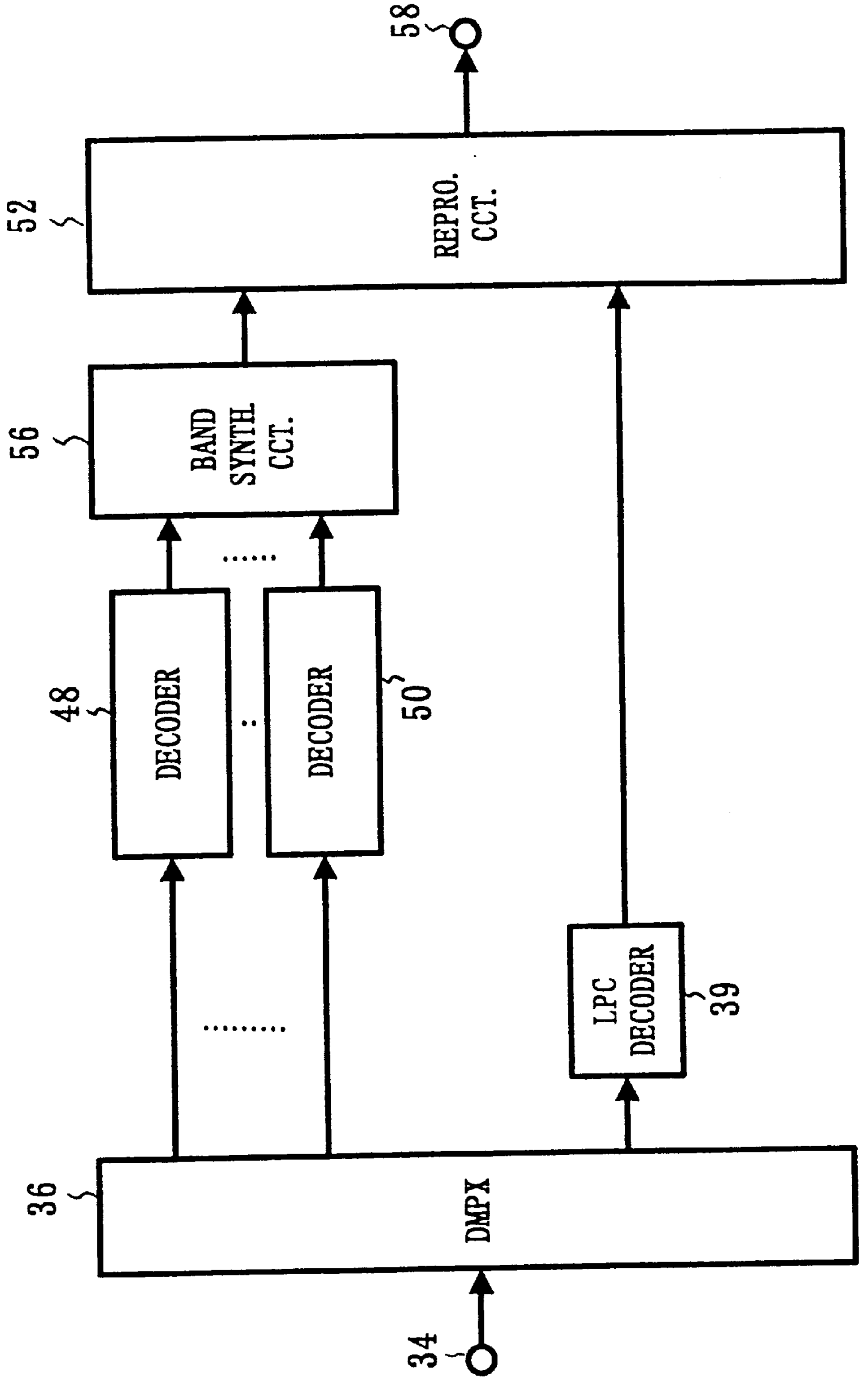
FIG. 12 shows the decoding part of a sixth embodiment.

FIG. 12 shows the decoding part of a sixth embodiment. A demultiplexer 36 obtains the codes by decoding the demodulation signals input from an input terminal 34. An LPC decoder 38 obtains each subband LPC coefficients by decoding each code. Decoders 48 and 50 obtain each excitation signal by decoding each code. A band synthesizer 56 synthesizes the fullband decoded excitation signal from the subband decoded excitation signals. A reproducing circuit 52 decodes the fullband (speech signal by using the decoded subband LPC coefficients and excitation signals, and outputs the decoded speech signal from an output terminal 58.

Figure 13:
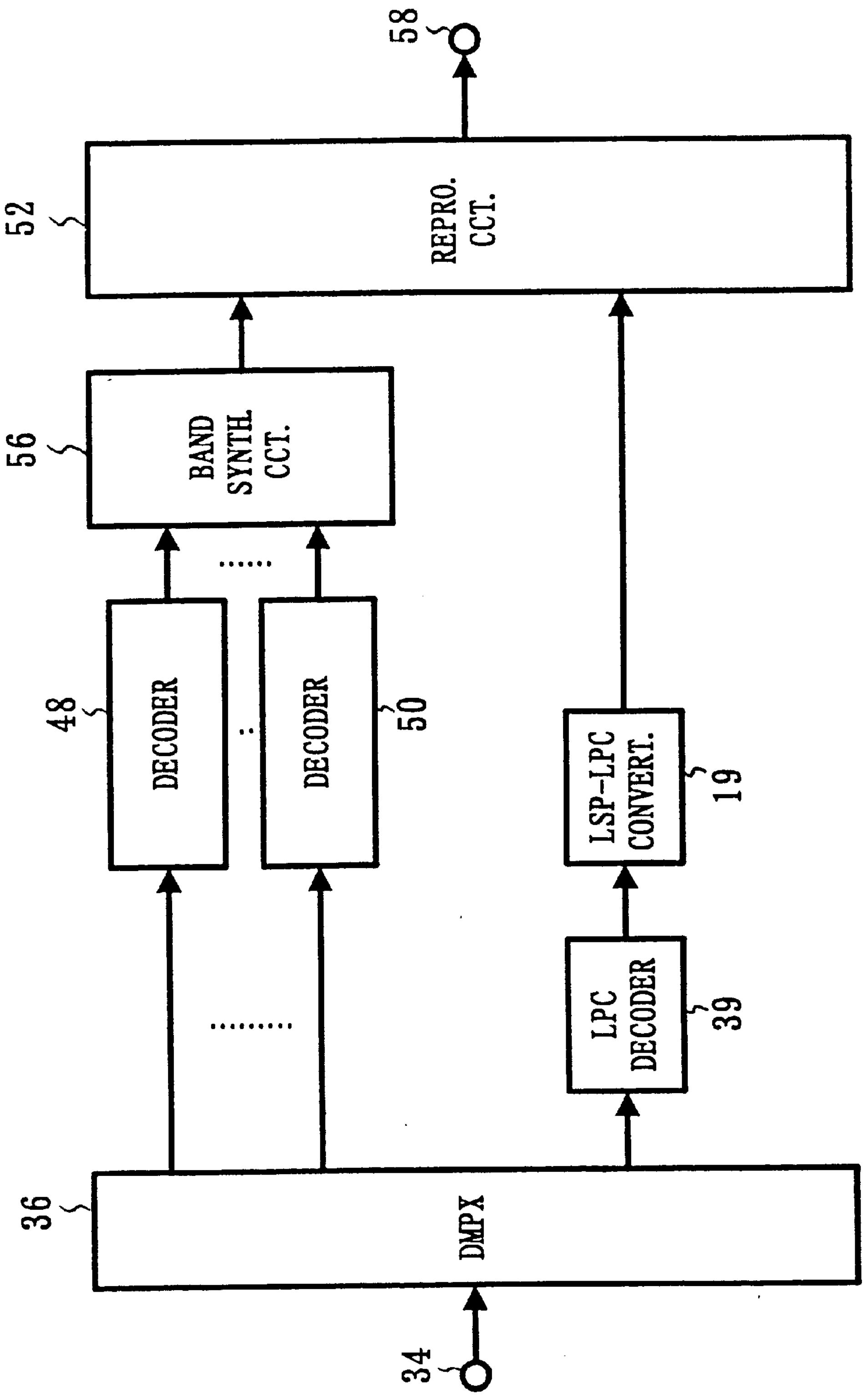
FIG. 13 shows the decoding part of a seventh embodiment.
Figure 14:
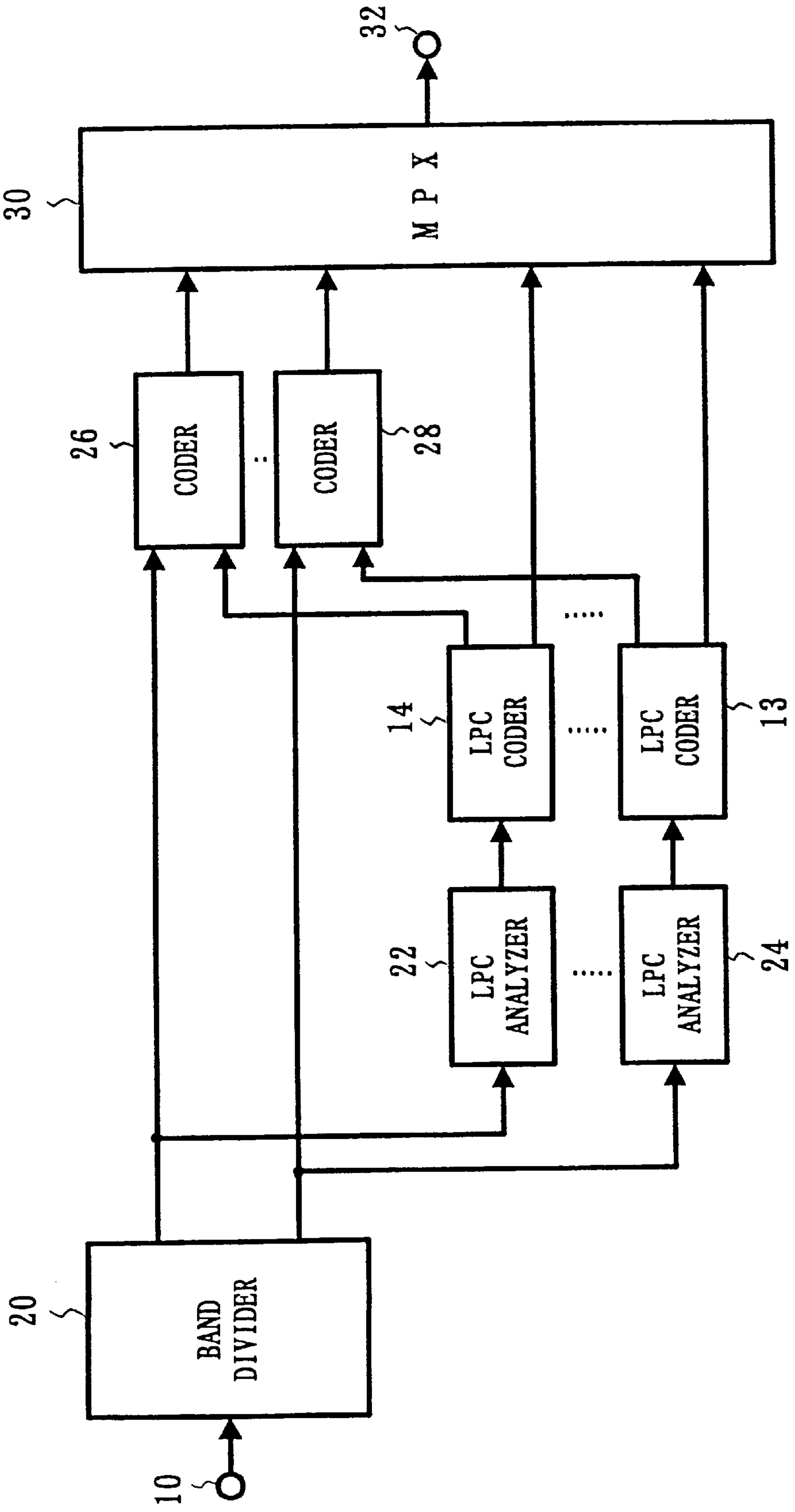
FIGS. 14 and 15 show block diagrams of a prior art wideband speech coding/decoding system.
Figure 15:
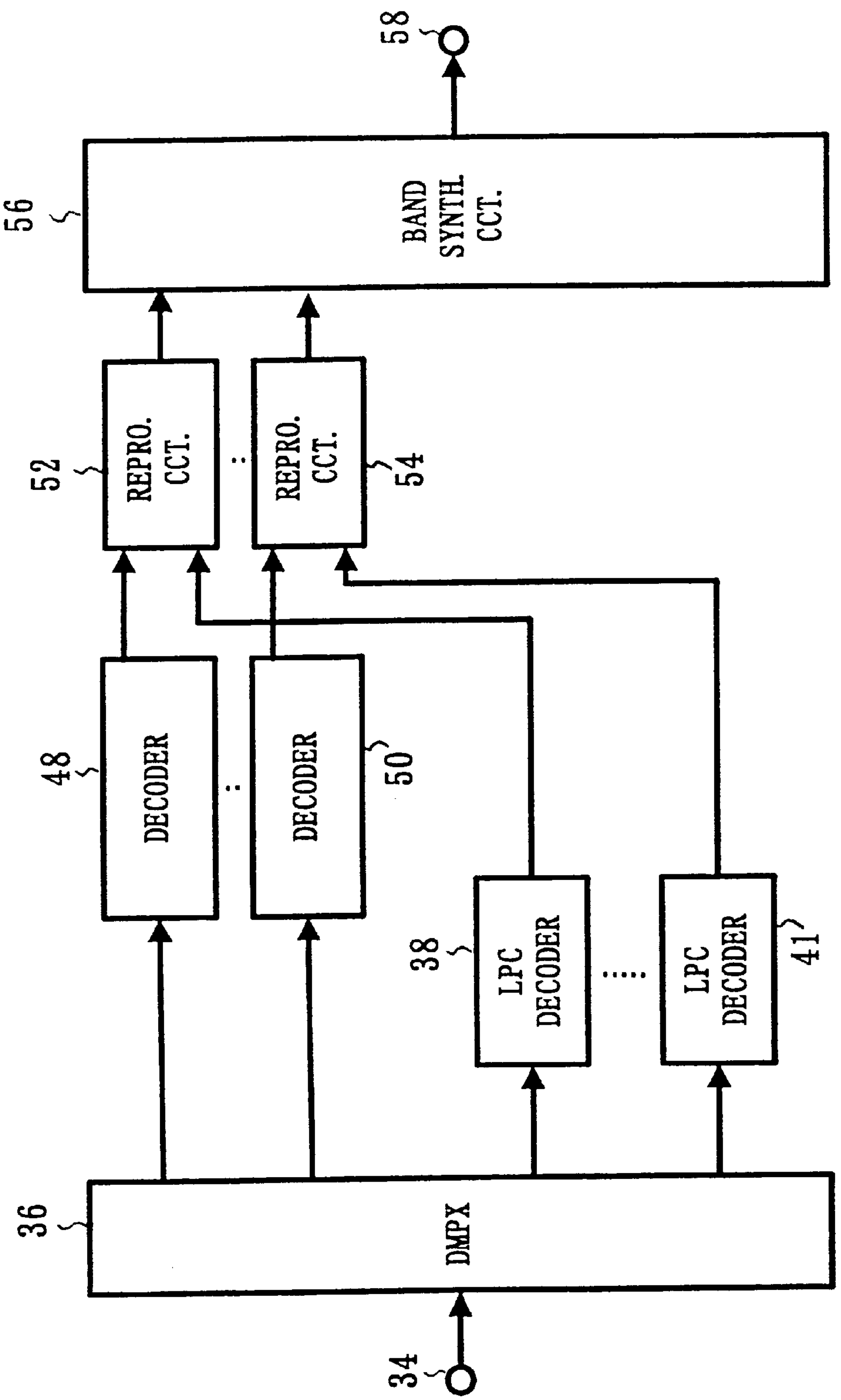

FIG. 13 shows the decoding port of a seventh embodiment. A demultiplexer 36 demodulates the codes from the demodulation signals input from an input terminal 34. An LSP decoder 39 obtains each subband LSP coefficients by obtaining each code. An LSP-LPC converter 10 converts each LSP coefficients into each subband LPC coefficients. Decoders 48 and 50 obtain the subband coded excitation signals by the decoding. A band synthesizer 56 synthesizes the fullband decoded excitation signal from the subband decoded excitation signals. A reproducing circuit 52 decodes the fullband speech signal by using the decoded LPC coefficients and excitation signal, and outputs the decoded speech signal of the full band from an output terminal 58.

In the coding part of the above sixth embodiment, the coder 26 can make perceptual weighting giving considerations to the person's perceptual characteristics by using the non-quantized LPC coefficients. Again in this case, like the case of using the quantized LPC coefficients, it is possible to divide the band of the quantized LPC coefficients by the agency of the LSP coefficients or impulse response and use each subband quantized LPC coefficients.

While the above embodiments are concerned with the LPC coefficients as coefficients obtained as the analysis result, the cepstrum coefficients, Parcor coefficients and impulse response may also be used likewise.

While the above embodiments are used demultiplexers and multiplexers, it is possible to omit the multiplexer and demultiplexer and directly transmit codes.

As has been described in the foregoing, according to the present invention it is not that the subband LPC coefficients are coded, but the fullband LPC coefficients is coded. Thus, band division filter characteristics or the like which do not need be transmitted are not contained in the LPC coefficients, and it is thus possible to improve coding performance of the LPC coefficients.

In addition, according to the present invention the LPC coefficient band division is done by the use of the impulse response, and it is possible to freely change the LPC prediction degree of each subband.

Moreover, according to the present invention the LPC analysis is executed before the band division with the band division filter. Thus, no band division delay is generated, and the LPC analysis window position is not limited by the band division filter.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A wideband speech coding system, comprising:

an LPC analyzing unit configured to receive an input speech signal and to calculate LPC coefficients of the input speech signal based on an LPC analysis of the input speech signal;

an LPC coding unit communicatively connected to the LPC analyzing unit and configured to code the LPC coefficients that have been calculated by the LPC analyzing unit;

an impulse response unit communicatively connected to the LPC coding unit and configured to calculate an impulse response of the input speech signal based on the coded LPC coefficients;

a first band divider communicatively connected to the impulse response unit and configured to divide the impulse response of the input speech signal into first through nth frequency bands, n being an integer greater than one;

first through nth LPC analyzer units communicatively connected to receive a corresponding one of the first through nth frequency bands of the input speech signal output from the first band divider, the first through nth LPC analyzer units configured to calculate first through nth subband LPC coefficients, respectively;

a second band divider configured to receive the input speech signal and to divide the input speech signal into first through nth subband signals respectively located in the first through nth frequency bands;

first through nth coder units communicatively connected to the second band divider and a corresponding one of the first through nth LPC analyzer units, the first through nth coder units configured to code an excitation signal using a corresponding one of the first through nth subband signals and a corresponding one of the first through nth subband LPC coefficients; and a multiplexing unit communicatively connected to the first through nth coder units and configured to modulate the coded excitation signal to create a modulated signal, and to output the modulated signal to an output terminal.

2. A wideband speech decoding system, comprising:

a demultiplexing unit configured to receive a modulated signal and to demodulate the modulated signal and to output a first signal as a result;

an LPC decoder unit communicatively connected to the demultiplexing unit and configured to perform LPC analysis so as to obtain LPC coefficients from the first signal;

an impulse response unit communicatively connected to the LPC decoder unit and configured to calculate an impulse response of the first signal based on the LPC coefficients;

a band divider communicatively connected to the impulse response unit and configured to divide the impulse response of the first signal into first through nth frequency bands, n being an integer greater than one;

first through nth LPC analyzer units communicatively connected to receive a corresponding one of the first through nth frequency bands of the first signal output from the band divider, the first through nth LPC analyzer units configured to calculate first through nth subband LPC coefficients, respectively;

first through nth decoder units configured to receive and decode the modulated signal and to obtain first through nth excitation signals for the first through nth frequency bands, respectively;

first through nth reproducing units communicatively connected to a corresponding one of the first through nth decoder units and a corresponding one of the first through nth LPC analyzer units, the first through nth reproducing units configured to reproduce a subband speech signal in the first through nth frequency bands, respectively, based on a corresponding one of the first through nth excitation signals and a corresponding one of the first through nth subband LPC coefficients; and a fullband synthesizing unit communicatively connected to the first through nth reproducing units and configured to create a fullband signal based on the corresponding subband speech signals in the first through nth frequency bands respectively output by the first through nth reproducing units.

3. A wideband speech coding system, comprising:

an LPC analyzing unit configured to receive an input speech signal and to calculate LPC coefficients of the input speech signal based on an LPC analysis of the input speech signal;

an LPC coding unit communicatively connected to the LPC analyzing unit and configured to code the LPC coefficients that have been calculated by the LPC analyzing unit;

a first band divider communicatively connected to the LPC coding unit and configured to divide a frequency band of the LPC coefficients into first through nth frequency bands, n being an integer greater than one, the first band divider further configured to calculate first subband LPC coefficients for the respective first through nth frequency bands;

a second band divider configured to receive the input speech signal and to divide the input speech signal into first through nth subband signals respectively located in the first through nth frequency bands, the second band divider further configured to calculate second subband LPC coefficients for the respective first through nth frequency bands;

first through nth coder units communicatively connected to the first and second band dividers, the first through nth coder units configured to code an excitation signal for each of the first through nth frequency bands using the first and second subband LPC coefficients for the respective first through nth frequency bands; and a multiplexing unit communicatively connected to the first through nth coder units and configured to modulate the coded excitation signal to create a modulated signal, and to output the modulated signal to an output terminal.

4. A wideband speech decoding system, comprising:

a demultiplexing unit configured to receive a modulated signal and to demodulate the modulated signal and to output a first signal as a result;

an LPC decoder unit communicatively connected to the demultiplexing unit and configured to perform LPC analysis so as to obtain LPC coefficients from the first signal;

a band divider communicatively connected to the LPC decoder unit and configured to divide the first signal into first through nth frequency bands, n being an integer greater than one, the band divider further configured to calculate first subband LPC coefficients for the respective first through nth frequency bands;

first through nth decoder units configured to receive the modulated signal and to obtain first through nth excitation signals for first through nth frequency bands, respectively;

first through nth reproducing units communicatively connected to receive the first subband LPC coefficients for a corresponding one of the first through nth frequency bands of the first signal output from the band divider, and communicatively connected to receive a corresponding one of the first through nth excitation signals respectively output from the first through nth decoder units, the first through nth reproducing units configured to demodulate a subband speech signal for each of the first through nth frequency bands as a result; and a fullband synthesizing unit communicatively connected to the first through nth reproducing units and configured to create a fullband signal based on the corresponding subband speech signals in the first through nth frequency bands respectively output by the first through nth reproducing units.

5. A wideband speech coding system, comprising:

an LPC analyzing unit configured to receive an input speech signal and to calculate LPC coefficients of the input speech signal based on an LPC analysis of the input speech signal;

an LPC coding unit communicatively connected to the LPC analyzing unit and configured to code the LPC coefficients that have been calculated by the LPC analyzing unit;

an impulse response unit communicatively connected to the LPC coding unit and configured to calculate an impulse response of the input speech signal based on the coded LPC coefficients;

a first band divider communicatively connected to the impulse response unit and configured to divide the impulse response of the input speech signal into first through nth frequency bands, n being an integer greater than one;

a second band divider configured to receive the input speech signal and to divide the input speech signal into first through nth subband signals respectively located in the first through nth frequency bands, the second band divider further configured to calculate second subband LPC coefficients for the respective first through nth frequency bands;

first through nth coder units communicatively connected to the first and second band dividers, the first through nth coder units configured to code an excitation signal for each of the first through nth frequency bands using the first and second subband LPC coefficients for the respective first through nth frequency bands; and a multiplexing unit communicatively connected to the first through nth coder units and configured to modulate the coded excitation signal to create a modulated signal, and to output the modulated signal to an output terminal.

6. A wideband speech decoding system, comprising:

a demultiplexing unit configured to receive a modulated signal and to demodulate the modulated signal and to output a first signal as a result;

an LPC decoder unit communicatively connected to the demultiplexing unit and configured to perform LPC analysis so as to obtain LPC coefficients from the first signal;

an impulse response unit communicatively connected to the LPC decoder unit and configured to calculate an impulse response of the first signal based on the LPC coefficients;

a band divider communicatively connected to the impulse response unit and configured to divide the input response of the first signal into first through nth frequency bands, n being an integer greater than one;

first through nth decoder units configured to receive the modulated signal and to obtain first through nth excitation signals for first through nth frequency bands, respectively;

first through nth reproducing units communicatively connected to receive the first subband LPC coefficients for a corresponding one of the first through nth frequency bands of the first signal output from the band divider, and communicatively connected to receive a corresponding one of the first through nth excitation signals respectively output from the first through nth decoder units, the first through nth reproducing units configured to demodulate a subband speech signal for each of the first through nth frequency bands as a result; and a fullband synthesizing unit communicatively connected to the first through nth reproducing units and configured to create a fullband signal based on the corresponding subband speech signals in the first through nth frequency bands respectively output by the first through nth reproducing units.

7. A wideband speech coding system, comprising:

an LPC analyzing unit configured to receive an input speech signal and to calculate LPC coefficients of the input speech signal based on an LPC analysis of the input speech signal;

an LPC coding unit communicatively connected to the LPC analyzing unit and configured to code the LPC coefficients that have been calculated by the LPC analyzing unit;

an LPC-LSP converter communicatively connected to the LPC coding unit and configured to convert the LPC coefficients into LSP coefficients;

an LSP band divider communicatively connected to the LPC-LSP converter and configured to divide the LSP coefficients into subband LSP coefficients for first through nth frequency bands, n being an integer greater than one;

first through nth LSP-LPC converters communicatively connected to receive a corresponding one of the subband LSP coefficients for the first through nth frequency bands output from the LSP band divider, the first through nth LSP-LPC converters configured to calculate first through nth subband LPC coefficients, respectively;

a band divider configured to receive the input speech signal and to divide the input speech signal into first through nth subband signals respectively located in the first through nth frequency bands;

first through nth coder units communicatively connected to the band divider and a corresponding one of the first through nth LSP-LPC converters, the first through nth coder units configured to code an excitation signal using a corresponding one of the first through nth subband signals and a corresponding one of the first through nth subband LPC coefficients; and a multiplexing unit communicatively connected to the first through nth coder units and configured to modulate the coded excitation signal to create a modulated signal, and to output the modulated signal to an output terminal.

8. A wideband speech decoding system, comprising:

a demultiplexing unit configured to receive a modulated signal and to demodulate the modulated signal and to output a first signal as a result;

an LPC decoder unit communicatively connected to the demultiplexing unit and configured to perform LPC analysis so as to obtain LPC coefficients from the first signal;

an LPC-LSP converter communicatively connected to the LPC decoder unit and configured to convert the LPC coefficients into LSP coefficients;

an LSP band divider communicatively connected to the LPC-LSP converter and configured to divide the LSP coefficients into subband LSP coefficients for first through nth frequency bands, n being an integer greater than one;

first through nth LSP-LPC converters communicatively connected to receive the subband LSP coefficients output from the band divider for a corresponding one of the first through nth frequency bands, and to calculate first through nth subband LPC coefficients, respectively;

first through nth decoder units configured to receive and decode the modulated signal and to obtain first through nth excitation signals for the first through nth frequency bands, respectively;

first through nth reproducing units communicatively connected to a corresponding one of the first through nth decoder units and a corresponding one of the first through nth LSP-LPC converters, the first through nth reproducing units configured to reproduce a subband speech signal in the first through nth frequency bands, respectively, based on a corresponding one of the first through nth excitation signals and a corresponding one of the first through nth subband LPC coefficients; and a fullband synthesizing unit communicatively connected to the first through nth reproducing units and configured to create a fullband signal based on the corresponding subband speech signals in the first through nth frequency bands respectively output by the first through nth reproducing units.

9. A wideband speech coding system, comprising:

an LPC analyzing unit configured to receive an input speech signal and to calculate LPC coefficients of the input speech signal based on an LPC analysis of the input speech signal;

an LPC-LSP converter communicatively connected to the LPC analyzing unit and configured to convert the LPC coefficients into LSP coefficients;

an LSP coding unit communicatively connected to the LPC-LSP converter and configured to code the LSP coefficient;

an LSP band divider communicatively connected to the LSP coding unit and configured to divide the LSP coefficients into subband LSP coefficients for first through nth frequency bands, n being an integer greater than one;

first through nth LSP-LPC converters communicatively connected to receive a corresponding one of the subband LSP coefficients for the first through nth frequency bands output from the LSP band divider, the first through nth LSP-LPC converters configured to calculate first through nth subband LPC coefficients, respectively;

a band divider configured to receive the input speech signal and to divide the input speech signal into first through nth subband signals respectively located in the first through nth frequency bands;

first through nth coder units communicatively connected to the band divider and a corresponding one of the first through nth LSP-LPC converters, the first through nth coder units configured to code an excitation signal using a corresponding one of the first through nth subband signals and a corresponding one of the first through nth subband LPC coefficients; and a multiplexing unit communicatively connected to the first through nth coder units and configured to modulate the coded excitation signal to create a modulated signal, and to output the modulated signal to an output terminal.

10. A wideband speech decoding system, comprising:

a demultiplexing unit configured to receive a modulated signal and to demodulate the modulated signal and to output a first signal as a result;

an LPC decoder unit communicatively connected to the demultiplexing unit and configured to perform LPC analysis so as to obtain LPC coefficients from the first signal;

an LSP band divider communicatively connected to the LPC decoder unit and configured to divide the LSP coefficients into subband LSP coefficients for first through nth frequency bands, n being an integer greater than one;

first through nth LSP-LPC converters communicatively connected to receive the subband LSP coefficients output from the band divider for a corresponding one of the first through nth frequency bands, and to calculate first through nth subband LPC coefficients, respectively;

first through nth decoder units configured to receive and decode the modulated signal and to obtain first through nth excitation signals for the first through nth frequency bands, respectively;

first through nth reproducing units communicatively connected to a corresponding one of the first through nth decoder units and a corresponding one of the first through nth LSP-LPC converters, the first through nth reproducing units configured to reproduce a subband speech signal in the first through nth frequency bands, respectively, based on a corresponding one of the first through nth excitation signals and a corresponding one of the first through nth subband LPC coefficients; and a fullband synthesizing unit communicatively connected to the first through nth reproducing units and configured to create a fullband signal based on the corresponding subband speech signals in the first through nth frequency bands respectively output by the first through nth reproducing units.

11. A wideband speech coding system, comprising:

a band divider configured to receive an input speech signal and to divide the input speech signal into first through nth subband signals respectively located in first through nth frequency bands, n being an integer greater than one;

first through nth LPC analyzing units communicatively connected to the band divider and configured to receive a corresponding one of the first through nth subband signals and to calculate first subband LPC coefficients of the corresponding one of the first through nth subband signals based on an LPC analysis of the corresponding one of the first through nth subband signals;

first through nth LPC-LSP converters communicatively connected to a corresponding one of the first through nth LPC analyzing units and configured to convert the first subband LPC coefficients into first subband LSP coefficients;

an LSP synthesizer unit communicatively connected to the first through nth LPC-LSP converters and configured to combine the first subband LSP coefficients in a particular order to obtain fullband LSP coefficients;

an LSP coding unit communicatively connected to the LSP synthesizer unit and configured to code the fullband LSP coefficients;

an LSP band divider communicatively connected to the LSP coding unit and configured to divide the fullband LSP coefficients into second subband LSP coefficients for the first through nth frequency bands;

first through nth LSP-LPC converters communicatively connected to the LPC band divider and configured to convert the second subband LSP coefficients for a corresponding one of the first through nth frequency bands into second subband LPC coefficients for the corresponding one of the first through nth frequency bands;

first through nth coder units communicatively connected to the band divider and a corresponding one of the first through nth LSP-LPC converters, the first through nth coder units configured to code an excitation signal using a corresponding one of the first through nth subband signals and a corresponding one of the second subband LPC coefficients for the first through nth frequency bands; and a multiplexing unit communicatively connected to the first through nth coder units and configured to modulate the coded excitation signal to create a modulated signal, and to output the modulated signal to an output terminal.

* * * * *